United States Patent
Chen et al.

(10) Patent No.: US 8,373,917 B2
(45) Date of Patent: Feb. 12, 2013

(54) ELECTROWETTING DISPLAY AND PIXEL ARRAY SUBSTRATE THEREOF AND ELECTROWETTING DISPLAY PIXEL STRUCTURE THEREOF

(75) Inventors: Cheng-Yi Chen, Changhua County (TW); Chih-Yuan Wang, Taichung County (TW)

(73) Assignee: Wintek Corporation, Taichung (TW)

( * ) Notice: Subject to any disclaimer, the term of this patent is extended or adjusted under 35 U.S.C. 154(b) by 120 days.

(21) Appl. No.: 12/979,327

(22) Filed: Dec. 28, 2010

(65) Prior Publication Data

US 2011/0157677 A1 Jun. 30, 2011

(30) Foreign Application Priority Data

Dec. 31, 2009 (TW) .............................. 98146187 A (51) Int. Cl.
*G02F 1/03* (2006.01)

(52) U.S. Cl. ........ 359/253; 359/245; 359/250; 359/252; 359/228; 362/107; 362/41; 362/60; 362/84; 349/187

(58) Field of Classification Search .......... 359/245–247, 359/250, 252–254, 228, 296; 345/32, 41, 345/60, 84, 105–107, 204; 252/500, 586
See application file for complete search history.

(56) References Cited

U.S. PATENT DOCUMENTS

| | | | | |
|---|---|---|---|---|
| 7,359,108 B2 * | 4/2008 | Hayes et al. | ................... | 359/296 |
| 7,746,540 B2 * | 6/2010 | Lo et al. | ........................ | 359/290 |
| 7,852,547 B2 * | 12/2010 | Kim | .............................. | 359/296 |
| 7,911,681 B2 * | 3/2011 | Ikegami et al. | ............... | 359/296 |
| 8,035,879 B2 * | 10/2011 | Wang et al. | .................... | 359/245 |
| 8,068,266 B2 * | 11/2011 | Kim et al. | ..................... | 359/254 |
| 8,172,375 B2 * | 5/2012 | Sugahara | ........................ | 347/84 |
| 2007/0127108 A1 | 6/2007 | Hayes et al. | | |
| 2011/0140996 A1 * | 6/2011 | Parry-Jones | .................... | 345/60 |
| 2011/0157678 A1 * | 6/2011 | Chen et al. | ..................... | 359/290 |

FOREIGN PATENT DOCUMENTS

WO 2008155925 12/2008

OTHER PUBLICATIONS

"First Office Action of China Counterpart Application", issued on Apr. 27, 2012, p. 1-4.

* cited by examiner

*Primary Examiner* — Loha Ben

(74) *Attorney, Agent, or Firm* — Jianq Chyun IP Office (57) ABSTRACT

An electrowetting display, a pixel array substrate thereof, and an electrowetting display pixel structure thereof are provided. The electrowetting display pixel structure is disposed on a substrate. The electrowetting display pixel structure includes a pixel electrode, a hydrophobic insulating layer and a wall. The pixel electrode is covered by the hydrophobic insulating layer. The wall is disposed on the hydrophobic insulating layer. The wall has a first side surface, a second side surface and at least one opening penetrating the first side surface and the second side surface. The opening is used for fluid medium to flow therethrough.

16 Claims, 6 Drawing Sheets

ELECTROWETTING DISPLAY AND PIXEL ARRAY SUBSTRATE THEREOF AND ELECTROWETTING DISPLAY PIXEL STRUCTURE THEREOF

CROSS-REFERENCE TO RELATED APPLICATION

This application claims the priority benefit of Taiwan application serial no. 98146187, filed on Dec. 31, 2009. The entirety of the above-mentioned patent application is hereby incorporated by reference herein and made a part of specification.

BACKGROUND OF THE INVENTION

1. Field of the Invention

The invention relates to an electrowetting display technology and more particularly to an electrowetting display, a pixel array substrate thereof, and an electrowetting display pixel structure thereof.

2. Description of Related Art

Figure 1:
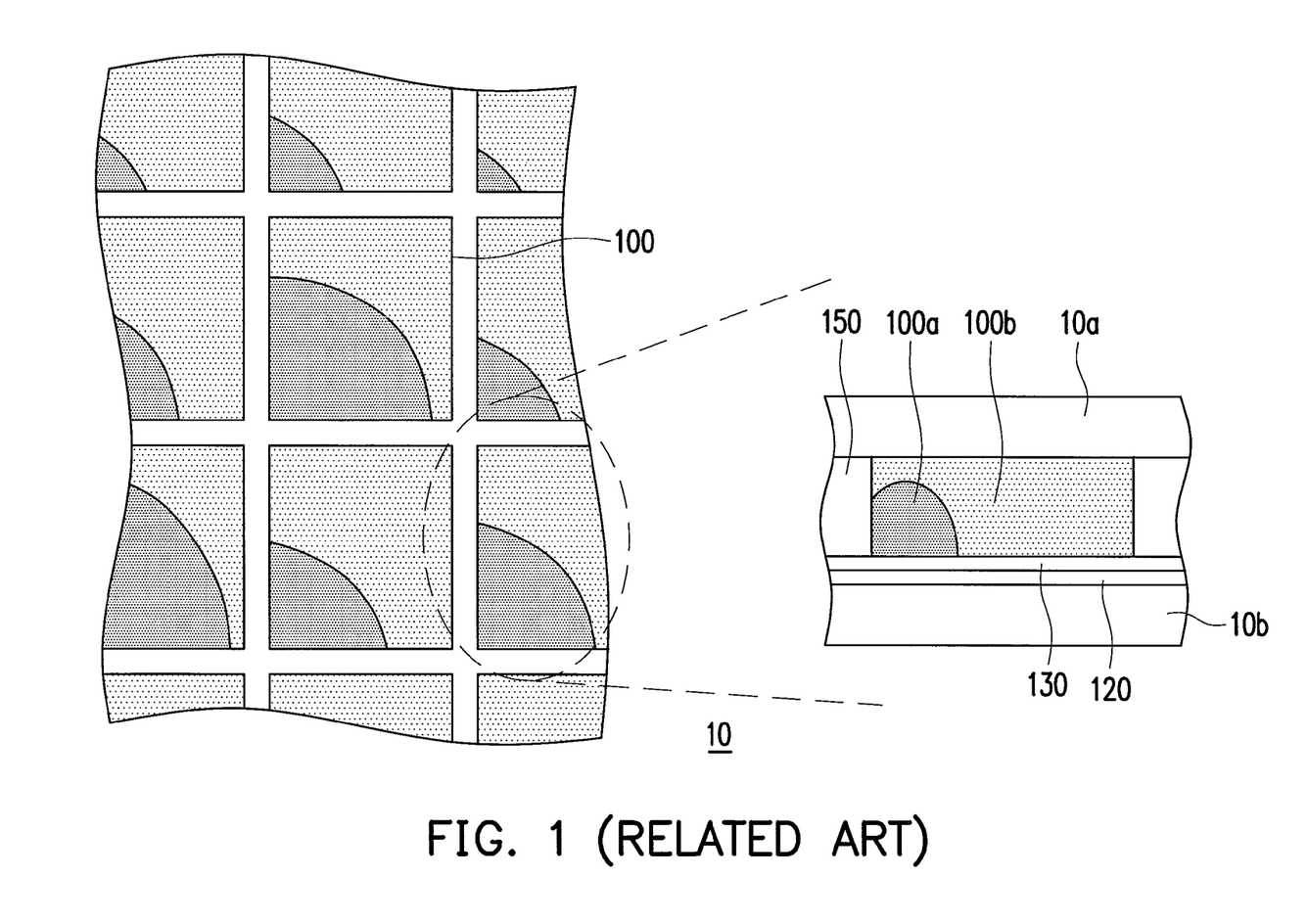
FIG. 1 is a top view showing a conventional electrowetting display.

FIG. 1 shows a top view and a partial cross-sectional view of a conventional electrowetting display. Referring to FIG. 1, an electrowetting display 10 includes a plurality of electrowetting display pixel structures 100. Each of the electrowetting display pixel structures 100 includes a pixel electrode 120 sandwiched between a substrate 10a and a substrate 10b, a hydrophobic insulating layer 130, an oily fluid medium 100a, an aqueous fluid medium 100b, and a wall 150. The hydrophobic insulating layer 130 is disposed on a surface of the pixel electrode 120. The wall 150 is disposed on the hydrophobic insulating layer 130. Moreover, the oily fluid medium 100a is disposed on a surface of the hydrophobic insulating layer 130, and the aqueous fluid medium 100b covers the oily fluid medium 100a.

In FIG. 1, each of the electrowetting display pixel structures 100 is applied with a voltage. At this time, the oily fluid medium 100a is pressed against the wall 150 and the aqueous fluid medium 100b contacts with the hydrophobic insulating layer 130. Here, the oily fluid medium 100a and the hydrophobic insulating layer 130 contact at a location on the bottom left of each of the electrowetting display pixel structures 100. Generally, the oily fluid medium 100a is a colored hydrophobic fluid medium and the aqueous fluid medium 100b is a transparent aqueous fluid medium. Therefore, after passing through the oily fluid medium 100a, a light is absorbed by the oily fluid medium 100a, and the color of the oily fluid medium 100a is thus displayed. On the other hand, the light passes through the transparent aqueous fluid medium 100b so as to result in a grayscale variation during display.

Theoretically, each of the electrowetting display pixel structures 100 should have equal amounts of oily fluid medium 100a. As a consequence, when the electrowetting display pixel structures 100 are applied with the same voltage, each contact area of the oily fluid medium 100a and the hydrophobic insulating layer 130 of the electrowetting display pixel structures 100 is the same. In addition, the thicknesses of the oily fluid medium 100a of the electrowetting display pixel structures 100 are also the same. Practically, it is difficult to obtain oily fluid medium 100a with the same thickness by driving each of the electrowetting display pixel structures 100 with the same voltage. In the fabrication of the electrowetting display pixel structures 100, when the volume of the oily fluid medium 100a differs in each of the electrowetting display pixel structures 100 due to fabrication deviation, the adjustment of the thickness of the oily fluid medium 100a becomes more difficult.

SUMMARY OF THE INVENTION

The invention is directed to a pixel array substrate and an electrowetting display pixel structure thereof. A wall disposed therein includes an opening and is therefore applied in an electrowetting display, such that the fluid medium is capable of flowing between different electrowetting display pixel structures.

The invention is directed to an electrowetting display having the pixel array substrate and the electrowetting display pixel structure, such that the display uniformity is greatly enhanced.

The invention is directed to an electrowetting display pixel structure disposed on a substrate. The electrowetting display pixel structure includes a pixel electrode, a hydrophobic insulating layer, and a wall. The hydrophobic insulating layer covers the pixel electrode. The wall is disposed on the hydrophobic insulating layer. The wall has a first side surface, a second side surface, and at least one opening penetrating the first side surface and the second side surface. The opening is configured for a fluid medium to flow therethrough.

The invention is further directed to a pixel array substrate including a substrate and a plurality of electrowetting display pixel structures. The electrowetting display pixel structures are arranged on the substrate in an array. Each of the electrowetting display pixel structures includes a pixel electrode, a hydrophobic insulating layer, and a wall. The hydrophobic insulating layer covers the pixel electrode. The wall is disposed on the hydrophobic insulating layer. The wall has a first side surface, a second side surface, and at least one opening penetrating the first side surface and the second side surface. The opening is configured for a fluid medium to flow therethrough.

The invention is further directed to an electrowetting display including a fluid medium, an opposite substrate, and a pixel array substrate. The fluid medium flows between the pixel array substrate and the opposite substrate. The opposite substrate includes a first substrate and a common electrode. The pixel array substrate includes a second substrate and a plurality of electrowetting display pixel structures, where the electrowetting display pixel structures are arranged on the second substrate in an array. Each of the electrowetting display pixel structures includes a pixel electrode, a hydrophobic insulating layer, and a wall. The hydrophobic insulating layer covers the pixel electrode. The wall is disposed on the hydrophobic insulating layer. The wall has a first side surface, a second side surface, and at least one opening penetrating the first side surface and the second side surface. The opening is configured for the fluid medium to flow therethrough.

According to one embodiment of the invention, the wall is a surrounding wall. In one embodiment, the surrounding wall surrounds to form a rectangle. In one embodiment, when the surrounding wall comprises a plurality of openings, the openings are respectively disposed on each of sub-walls constituting the surrounding wall.

According to an embodiment of the invention, the wall includes a first portion, a second portion, and a third portion. The first portion and the second portion are separated from each other. The third portion is located underneath the opening and connected between the first portion and the second portion.

According to one embodiment of the invention, the height of the opening is equal to the height of the wall.

In light of the foregoing, in the pixel array substrate and the electrowetting display pixel structure thereof, each wall disposed therein includes at least one opening. The pixel array substrate and the electrowetting display pixel structures thereof in the invention are adopted in the electrowetting display. The fluid medium is then capable of flowing between different electrowetting display pixel structures. Consequently, the non-uniform image resulting from non-uniform thickness of the fluid medium in the conventional electrowetting display technology can be solved. Overall, the electrowetting display of the invention has favorable display quality.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

It should be noted that in the following embodiments, an electrowetting display is an active electrowetting display or a passive electrowetting display. In addition, the electrowetting display of the present embodiment is a transmissive electrowetting display, a reflective electrowetting display, or a transflective electrowetting display. Regarding the transmissive or transflective electrowetting display, a backlight module can be further disposed therein to provide a backlight source. As for the reflective electrowetting display, an environmental light is used as the light source.

Figure 2:
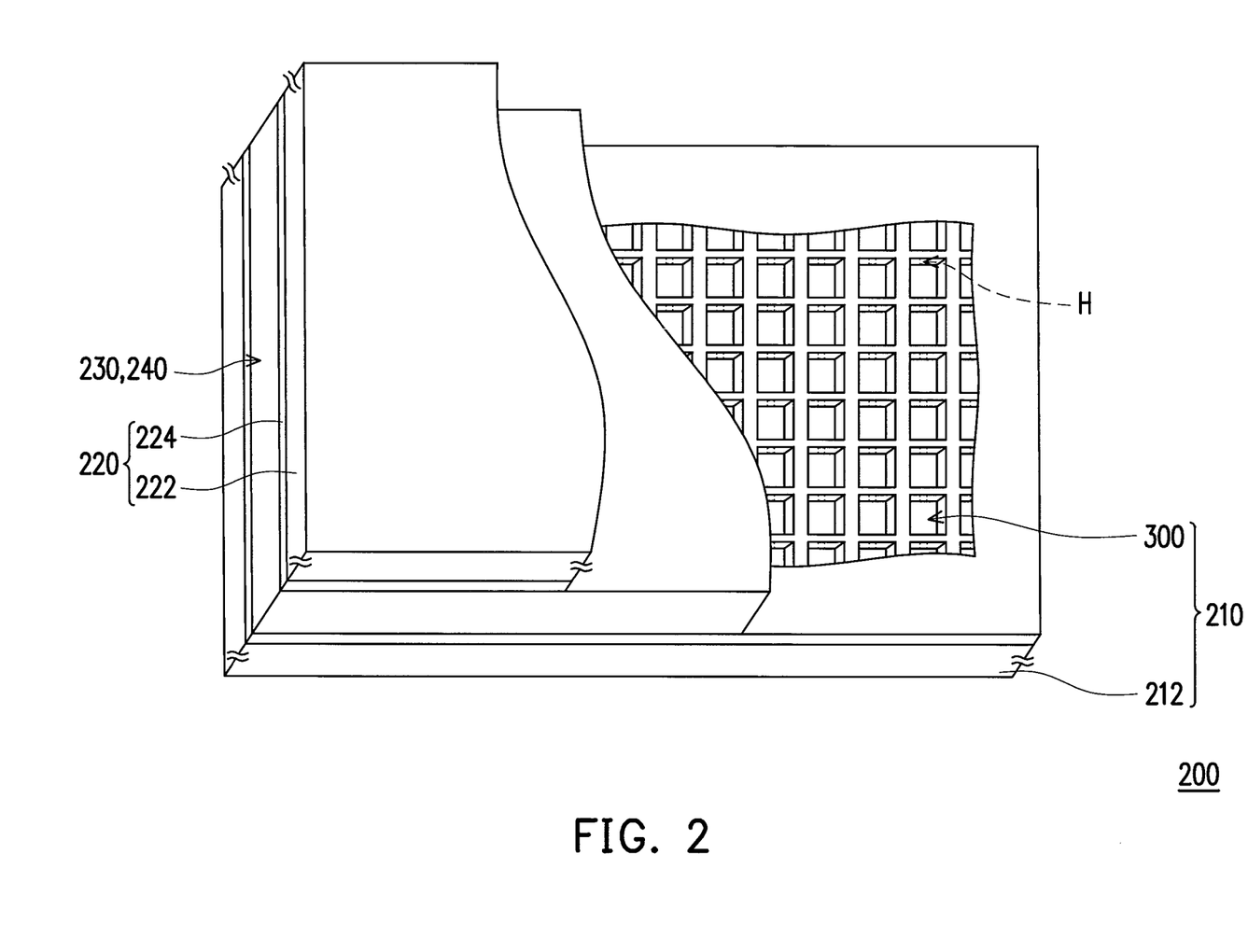
FIG. 2 is a partial cross-sectional top view schematically illustrating an electrowetting display according to an embodiment of the invention.

FIG. 2 is a partial cross-sectional top view schematically illustrating an electrowetting display according to an embodiment of the invention. Referring to FIG. 2, an electrowetting display 200 of the present embodiment includes a pixel array substrate 210, an opposite substrate 220, a fluid medium 230, and a fluid medium 240. In the present embodiment, the two fluid media 230, 240 flow between the pixel array substrate 210 and the opposite substrate 220. Moreover, the two fluid media 230, 240 are insoluble in each other. In practice, a colored oily fluid medium and a transparent aqueous fluid medium are respectively adopted as the fluid medium 230 and the fluid medium 240. However, the invention is not limited thereto.

In the present embodiment, the opposite substrate 220 includes a substrate 222 and a common electrode 224. The common electrode 224 is located between the fluid medium 230 and the substrate 222. On the other hand, the pixel array substrate 210 includes a substrate 212 and a plurality of electrowetting display pixel structures 300. The electrowetting display pixel structures 300 are arranged on the substrate 212 in an array.

Figure 3A:
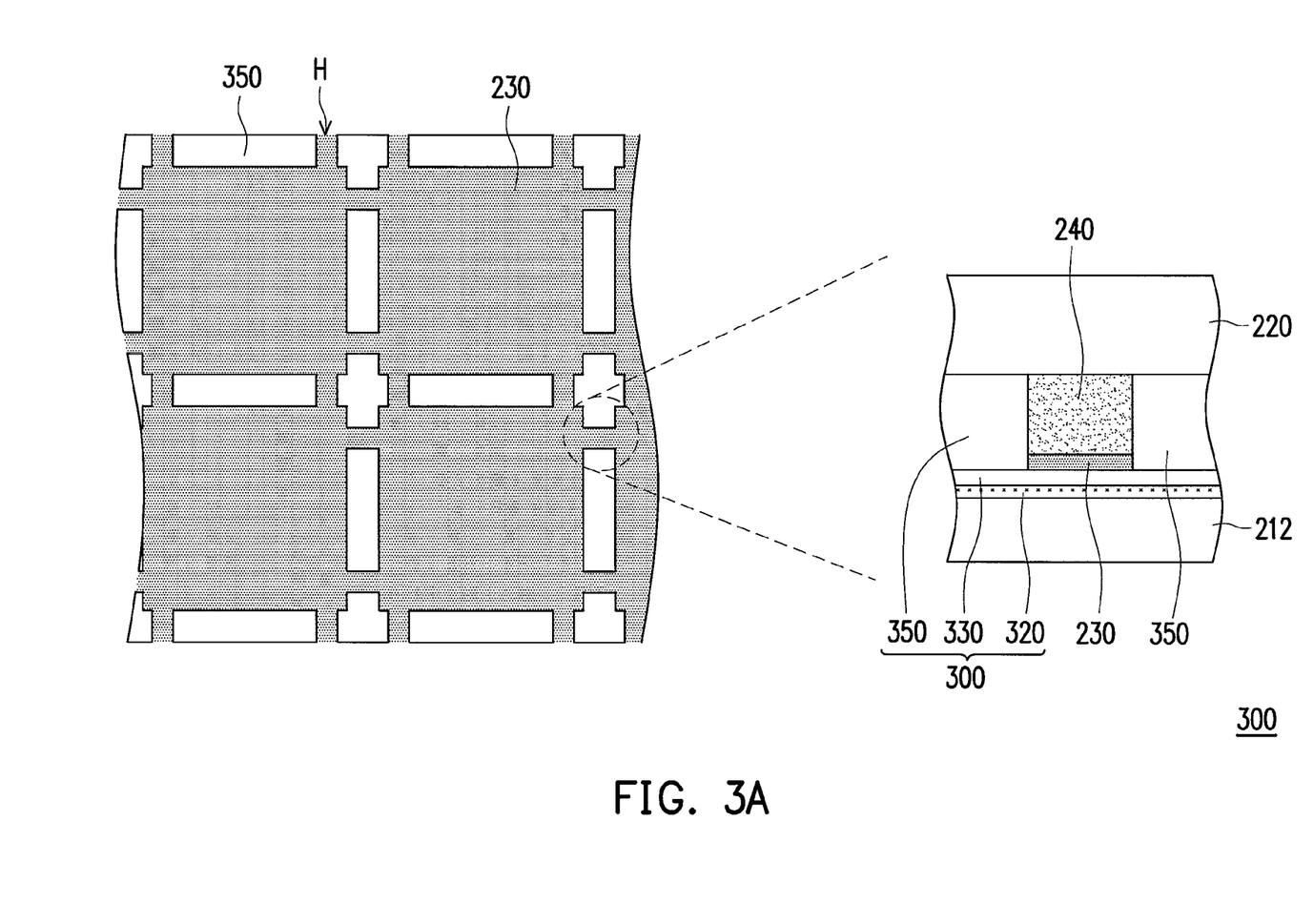
FIG. 3A and FIG. 3B are respectively partial top views schematically illustrating two modes of an electrowetting display pixel structure, where the electrowetting display pixel structure is not applied with a voltage or is applied with a voltage according to an embodiment of the invention.

Referring to FIG. 3A, in the present embodiment, each of the electrowetting display pixel structures 300 includes a pixel electrode 320, a hydrophobic insulating layer 330, and a wall 350. The hydrophobic insulating layer 330 covers the pixel electrode 320, and the wall 350 is disposed on the hydrophobic insulating layer 330. It should be noted that each wall 350 of the present embodiment is a surrounding wall, for example. The surrounding wall surrounds to form, for example, a rectangle. However, the invention is not limited to this structure.

Figure 3B:
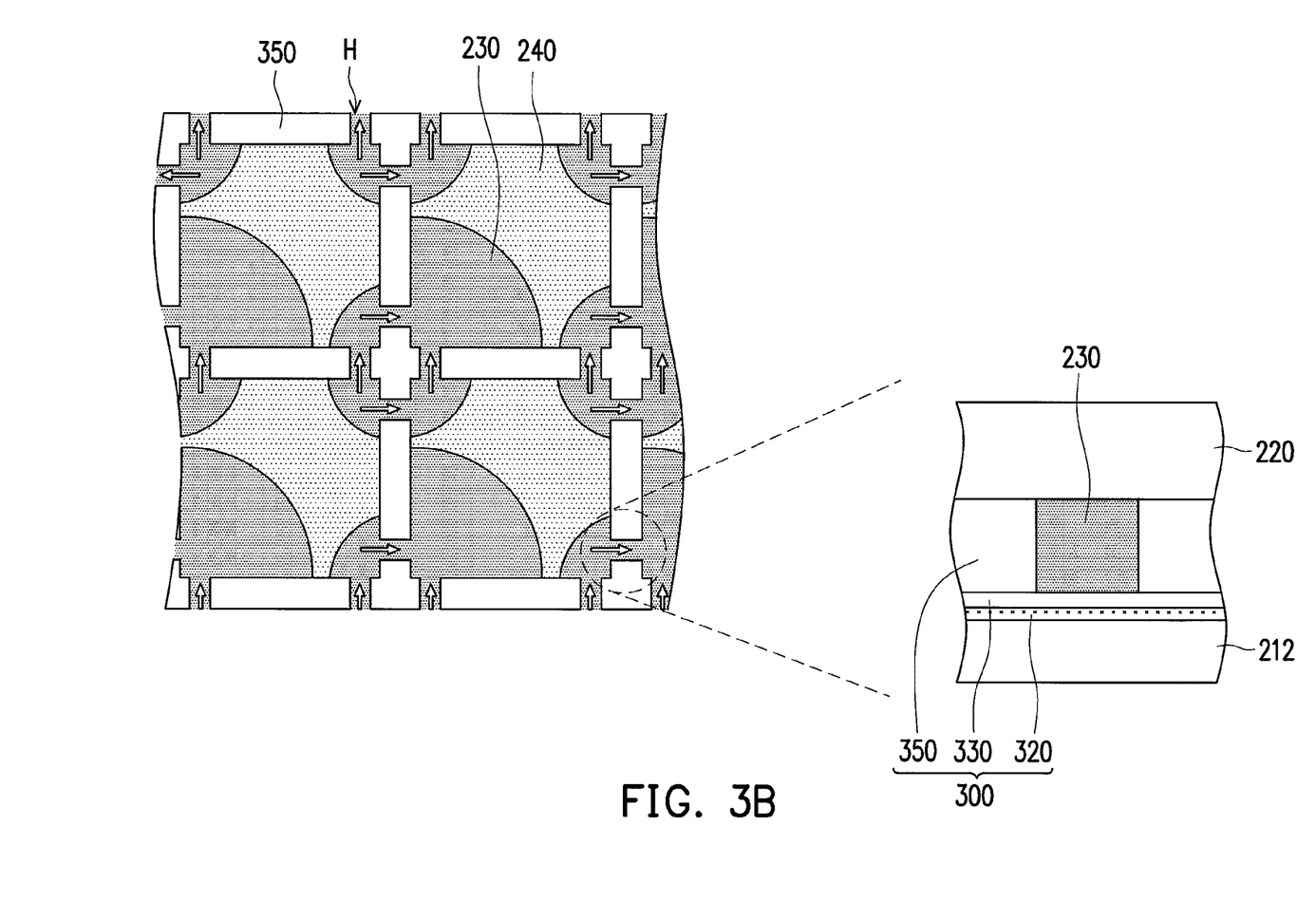

In the present embodiment, the compression of the fluid medium 230 is determined through a voltage difference between the pixel electrode 320 in the pixel array substrate 210 and the common electrode 224 in the opposite substrate 220. Specifically, as shown in FIG. 3A, when no voltage is applied, the fluid medium 230 covers the substrate 212 uniformly. Thus, the backlight or environmental light is absorbed by the colored (i.e. black) fluid medium 230, such that the electrowetting display 200 displays the color (i.e. black). Alternatively, as depicted in FIG. 3B, when a voltage is applied, a polarization phenomenon occurs at an interface between the oily fluid medium 230 and the aqueous fluid medium 240. As a consequence, the oily fluid medium 230 is pressed against the wall 350, thereby reducing the distribution of the fluid medium 230. At this time, the backlight passes through the transparent fluid medium 240 or the environmental light is reflected by the substrate 212, so that the electrowetting display 200 is capable of displaying images.

Accordingly, in the present embodiment, the images are displayed by switching between the two modes shown in FIG. 3A and FIG. 3B. Nevertheless, the thickness of the fluid medium 230 affects an optical effect after the fluid medium 230 absorbs or reflects the light, and the display effect and the display quality are thus affected. In order to solve the non-uniform thickness of the fluid medium 230, each wall 350 of the present embodiment has at least one opening H. As shown in FIG. 3B, through the disposition of the opening H, flowing directions of the fluid medium 230 are directed by arrows. Thus, as for the fluid medium 230, all of the electrowetting display pixel structures 300 are connected to each other, so that the fluid medium 230 in each of the electrowetting display pixel structures 300 has approximately the same thickness.

Figure 4:
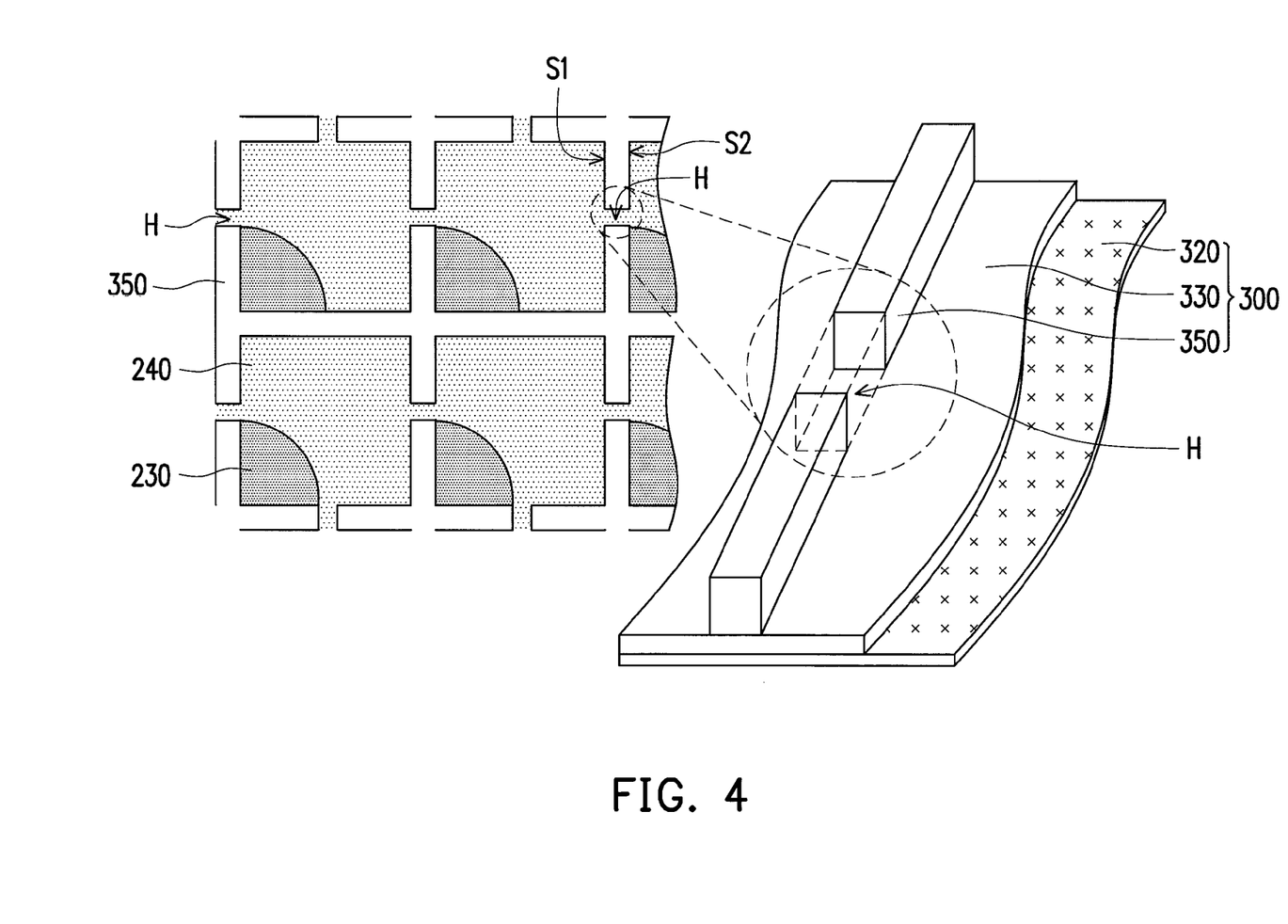
FIG. 4 is a partial top view schematically illustrating several electrowetting display pixel structures in FIG. 2.

In details, referring to FIG. 4, in the present embodiment, each wall 350 further has a side surface S1, a side surface S2, and a plurality of openings H penetrating the first side surface S1 and the second side surface S2. Here, an opening H is disposed on each of four sub-walls constituting each wall 350 for the fluid medium 230 to flow therethrough. Notably, in other embodiments, each wall 350 only has one opening H or has a plurality of openings H respectively disposed on the four sub-walls. In short, the invention does not limit the number of the openings H on each wall 350.

Figure 5:
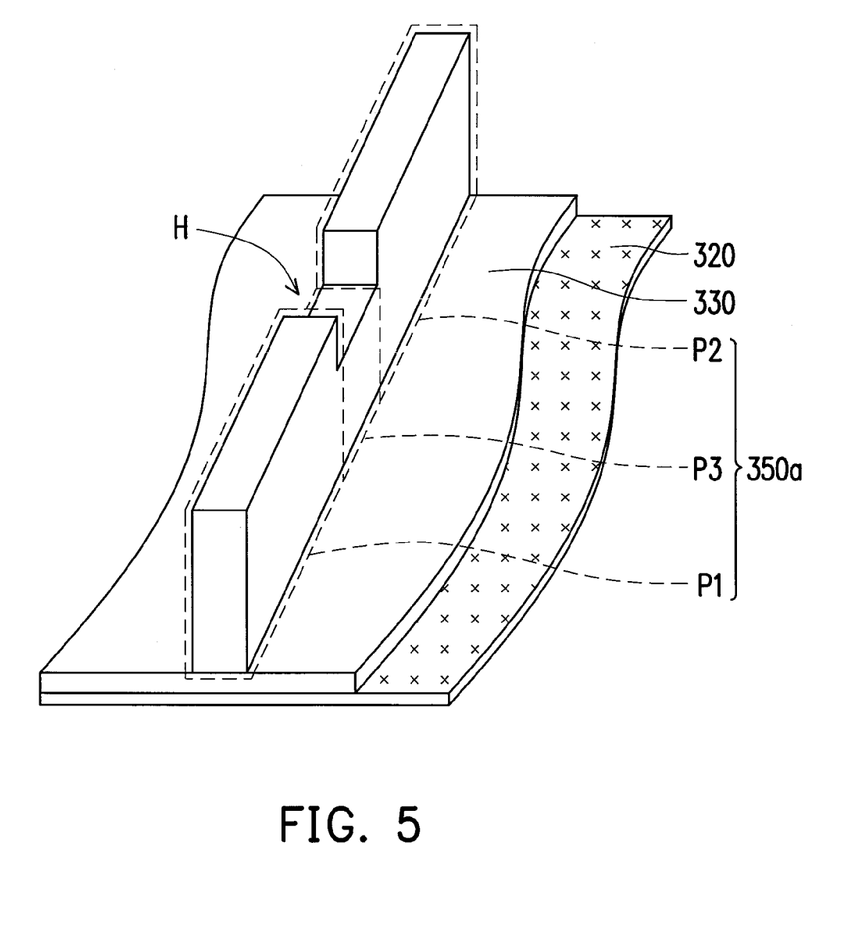
FIG. 5 is a partial cross-sectional top view schematically illustrating an electrowetting display pixel structure according to another embodiment of the invention.

As depicted in FIG. 4, the height of the opening H is equal to the height of each wall 350 in the present embodiment. Therefore, the openings H separate the walls 350 on the respective sides entirely. Nevertheless, the invention should not be construed as limited to the embodiments set forth herein. In other embodiments, the type of the opening H can also be as the opening shown in FIG. 5. Specifically, a wall 350a includes a first portion P1, a second portion P2, and a third portion P3. Here, the first portion P1 and the second portion P2 are separated from each other. The third portion P3 is connected between the first portion P1 and the second portion P2, and located underneath the opening H.

In the conventional electrowetting display technique, regardless of the method of filling the fluid medium 230 into the traditional electrowetting display, the adjustment of the thickness uniformity of the fluid medium 230 is still difficult. Thus, the thicknesses of the fluid medium 230 in different electrowetting display pixel structures differ substantially. Moreover, the optical effects of the light passing through different electrowetting display pixel structures are consequently different. Since the thickness of the fluid medium 230 and the variation of the contact angle of the fluid medium 230 are proportional, the fluid medium of different thicknesses has different responding rates under the same driving voltage, so as to result in a non-uniform image.

However, in the present embodiment, the design of the traditional wall which is merely used for isolating adjacent pixels is improved into the wall 350 having a feature similar to that of a connection tube. In other words, each wall 350 disposed in each electrowetting display pixel structure 300 of the present embodiment has the opening H, which allows the fluid medium 230 to flow through all of the electrowetting display pixel structures 300, so as to solve the non-uniform thickness of the fluid medium 230.

In summary, openings are included on the walls of the electrowetting display and the electrowetting display pixel structure of the pixel array substrate thereof. Through the disposition of the openings, the non-uniform thickness of the fluid medium in different electrowetting display pixel structures is solved, such that the display quality of the electrowetting display is improved.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electrowetting display pixel structure, disposed on a substrate, the electrowetting display pixel structure comprising:
a pixel electrode;
a hydrophobic insulating layer, covering the pixel electrode; and
a wall, disposed on the hydrophobic insulating layer and having a first side surface, a second side surface, and at least one opening penetrating the first side surface and the second side surface, wherein the opening is configured for a fluid medium to flow therethrough, and wherein the wall comprises a first portion, a second portion, and a third portion, the first portion and the second portion are separated from each other, and the third portion is located underneath the opening and connected between the first portion and the second portion.

2. The electrowetting display pixel structure as claimed in claim 1, wherein the wall is a surrounding wall.

3. The electrowetting display pixel structure as claimed in claim 2, wherein the surrounding wall surrounds to form a rectangle.

4. The electrowetting display pixel structure as claimed in claim 3, wherein when the surrounding wall comprises a plurality of openings, the openings are respectively disposed on each of a plurality of sub-walls constituting the surrounding wall.

5. A pixel array substrate, comprising:
a substrate; and
a plurality of electrowetting display pixel structures arranged on the substrate in an array, wherein each of the electrowetting display pixel structures comprises:
a pixel electrode;
a hydrophobic insulating layer, covering the pixel electrode; and
a wall, disposed on the hydrophobic insulating layer and having a first side surface, a second side surface, and at least one opening penetrating the first side surface and the second side surface, wherein the opening is configured for a fluid medium to flow therethrough, the wall comprises a first portion, a second portion, and a third portion, the first portion and the second portion are separated from each other, and the third portion is located underneath the opening and connected between the first portion and the second portion.

6. The pixel array substrate as claimed in claim 5, wherein the wall is a surrounding wall.

7. The pixel array substrate as claimed in claim 6, wherein the surrounding wall surrounds to form a rectangle.

8. The pixel array substrate as claimed in claim 7, wherein when the surrounding wall comprises a plurality of openings, the openings are respectively disposed on each of a plurality of sub-walls constituting the surrounding wall.

9. An electrowetting display, comprising:
a pixel array substrate, wherein the pixel array substrate comprises:
a first substrate;
a plurality of electrowetting display pixel structures arranged on the first substrate in an array, wherein each of the electrowetting display pixel structures comprises:
a pixel electrode;
a hydrophobic insulating layer, covering the pixel electrode; and
a wall, and wherein disposed on the hydrophobic insulating layer and having a first side surface, a second side surface, and at least one opening penetrating the first side surface and the second side surface, wherein the wall comprises a first portion, a second portion, and a third portion, the first portion and the second portion are separated from each other, and the third portion is located underneath the opening and connected between the first portion and the second portion;
an opposite substrate, opposite to the pixel array substrate; and
a fluid medium flowing between the pixel array substrate and the opposite substrate, wherein the opening is configured for the fluid medium to flow therethrough.

10. The electrowetting display as claimed in claim 9, wherein the opposite substrate comprises:
a second substrate; and
a common electrode, disposed between the fluid medium and the second substrate.

11. The electrowetting display as claimed in claim 9, wherein the wall is a surrounding wall.

12. The electrowetting display as claimed in claim 11, wherein the surrounding wall surrounds to form a rectangle.

13. The electrowetting display as claimed in claim 12, wherein when the surrounding wall comprises a plurality of openings, the openings are respectively disposed on each of a plurality of sub-walls constituting the surrounding wall.

14. An electrowetting display pixel structure, disposed on a substrate, the electrowetting display pixel structure comprising:
- a pixel electrode;
- a hydrophobic insulating layer, covering the pixel electrode; and
- a wall, disposed on the hydrophobic insulating layer and having a first side surface, a second side surface, and at least one opening penetrating the first side surface and the second side surface, wherein the opening is configured for a fluid medium to flow therethrough and a height of the opening is equal to a height of the wall.

15. A pixel array substrate, comprising:
- a substrate; and
- a plurality of electrowetting display pixel structures arranged on the substrate in an array, wherein each of the electrowetting display pixel structures comprises:
  - a pixel electrode;
  - a hydrophobic insulating layer, covering the pixel electrode; and
  - a wall, disposed on the hydrophobic insulating layer and having a first side surface, a second side surface, and at least one opening penetrating the first side surface and the second side surface, wherein the opening is configured for a fluid medium to flow therethrough and a height of the opening is equal to a height of the wall.

16. An electrowetting display, comprising:
- a pixel array substrate comprising:
  - a first substrate;
  - a plurality of electrowetting display pixel structures arranged on the first substrate in an array, wherein each of the electrowetting display pixel structures comprises:
    - a pixel electrode;
    - a hydrophobic insulating layer, covering the pixel electrode; and
    - a wall, disposed on the hydrophobic insulating layer and having a first side surface, a second side surface, and at least one opening penetrating the first side surface and the second side surface, wherein a height of the opening is equal to a height of the wall;
- an opposite substrate, opposite to the pixel array substrate; and
- a fluid medium flowing between the pixel array substrate and the opposite substrate, wherein the opening is configured for the fluid medium to flow therethrough.

* * * * *